Sept. 30, 1958  W. G. DUDLEY ET AL  2,854,625
METHOD FOR DETERMINING ARGON
Filed April 21, 1954  2 Sheets-Sheet 1

INVENTORS.
William G. Dudley
Walter F. Gerdes

BY  Griswold & Burdick
ATTORNEYS

Sept. 30, 1958     W. G. DUDLEY ET AL     2,854,625

METHOD FOR DETERMINING ARGON

Filed April 21, 1954

INVENTORS.
William G. Dudley
Walter F. Gerdes

BY *Griswold & Burdick*
ATTORNEYS

United States Patent Office 2,854,625
Patented Sept. 30, 1958

2,854,625

METHOD FOR DETERMINING ARGON

William G. Dudley, Houston, and Walter F. Gerdes, Lake Jackson, Tex., assignors to The Dow Chemical Company, Midland, Mich., a corporation of Delaware Application April 21, 1954, Serial No. 424,632

3 Claims. (Cl. 324—33)

This invention relates to a method for determining the concentration of argon and other montoatomic gases in gaseous mixtures such as those containing large proportions of nitrogen and hydrogen, e. g. ammonia synthesis gas.

In the synthesis of ammonia, a gaseous mixture consisting largely of hydrogen and atmospheric nitrogen in a mole ratio of about 3:1 is passed under superatmospheric pressure through a catalyst-containing reaction chamber wherein conversion to ammonia occurs. Upon separating ammonia from the product gas stream, unconverted gases are recycled to the reactor. As a result of repeated cycling, argon and other monoatomic, i. e. noble, gases of the atmosphere eventually come to constitute a substantial proportion of the recycle stream, e. g. as much as 20 percent or more by volume of argon in addition to smaller amounts of neon, krypton, xenon, etc. By venting or otherwise withdrawing a small proportion of the unconverted gases from the system, it is possible to maintain the concentration of argon in the feed to the reactor and in the recycle stream itself below a certain predetermined value. To do this both continuously and effectively without wasting synthesis gas requires a rapid and accurate method for determining the concentration of argon in a gaseous mixture thereof with hydrogen and nitrogen. Prior to the present invention, no such method was apparently known. Furthermore, except for the mass spectrograph, known methods for determining the argon content of gaseous mixtures require the removal of hydrogen and substantially all other diluents except nitrogen.

It is therefore a principal object of the invention to provide an economical method for rapidly and continuously measuring the concentration of argon in the presence of nitrogen and hydrogen. Another object is to provide a continuous method for determining the proportion of argon in admixture with nitrogen, hydrogen, and trace amounts of monoatomic gases other than argon. A still further object is a method for controlling the amount of argon and other monoatomic gases in ammonia synthesis gas.

The present invention is based upon the principle that when a glow discharge is established between two electrodes in a gaseous mixture containing argon, nitrogen, and hydrogen, the potential across the electrodes at constant current and pressure is a function of the argon content. The voltage required to sustain a constant current glow discharge is an inverse function of the concentration of argon in such a mixture.

In accordance with the invention, the argon content of a gas stream containing nitrogen and hydrogen is determined by passing a stream of such a gas under a constant reduced pressure through a glow discharge tube, maintaining a continuous electric glow discharge of constant current between the electrodes of said tube, and measuring the potential across the electrodes.

The method of the present invention will best be understood by reference to the accompanying drawing wherein.

Figure 1:
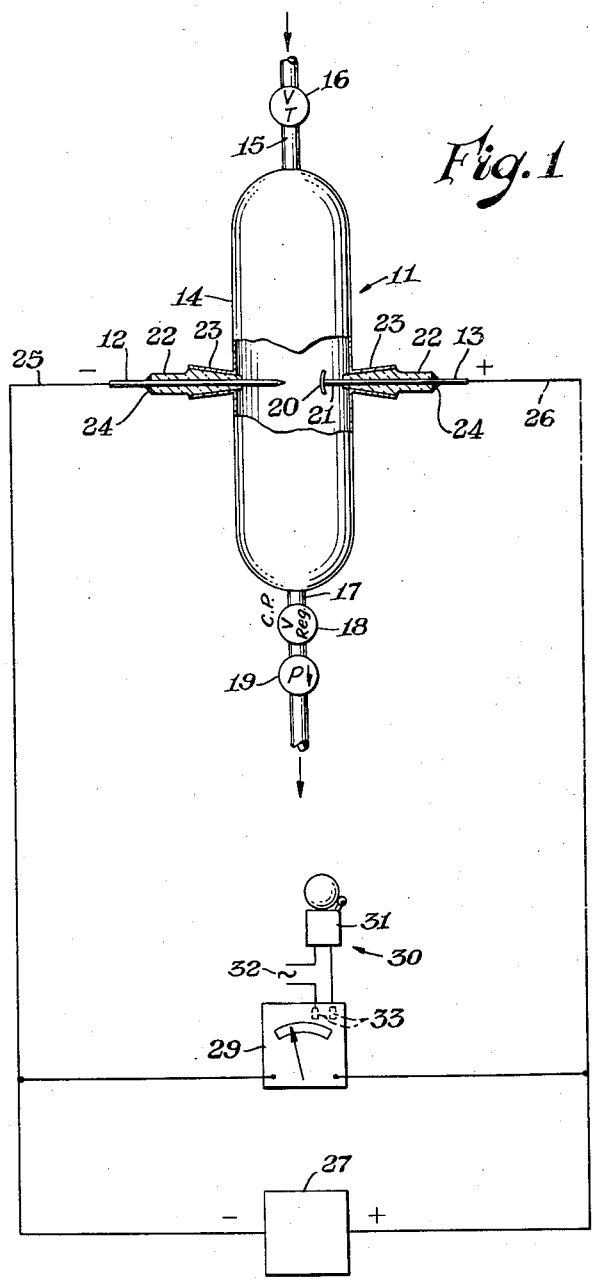
Fig. 1 is a simplified diagrammatic view of an apparatus for determining the concentration of argon in admixture with hydrogen and nitrogen.

Shown in Fig. 1 is a glow discharge tube 11 comprising a pair of electrodes 12 and 13 sealed in a cylindrical glass envelope 14. Connected to the top of the envelope 14 is a gas inlet tube 15 provided with a throttling valve 16 to restrict its opening. At the bottom of the envelope 14 is a gas outlet tube 17 which is connected through a pressure regulating valve 18 to a vacuum pump 19. Referring now to the electrodes, the negative electrode or cathode 12 is a pointed tungsten wire while the positive electrode or anode 13 consists of a platinum disc 20 welded to the end of an electrically conducting wire 21. These electrodes are sealed within ground glass fittings 22 which are seated in ground glass receivers 23 in the wall of the envelope 14 on opposite sides thereof. Since the electrodes 12 and 13 are sealed into the fittings 22 by means of a thermally plastic cement 24, they are easily replaceable as well as adjustable with respect to their spacing from each other. Lead wires 25 and 26 welded to the electrodes are attached to a current-regulated power supply 27 adapted to provide sufficient potential to cause glow discharge in the tube 11 and to maintain constant the discharge current. Connected across the lead wires 25 and 26 between the glow discharge tube 11 and the constant current voltage source 27 is a suitable meter for measuring the potential difference between the electrodes 12 and 13, viz. a circuit including a recording voltmeter 29 and having a range of from 235 volts to about 305 volts. An alarm system 30 is provided consisting of a bell 31 energized from a current source 32 by way of normally open auxiliary contacts 33 built into the voltmeter 29 which are closed when the indicating element of the meter reaches a predetermined minimum voltage corresponding to a maximum value or limit for argon content.

Figure 2:
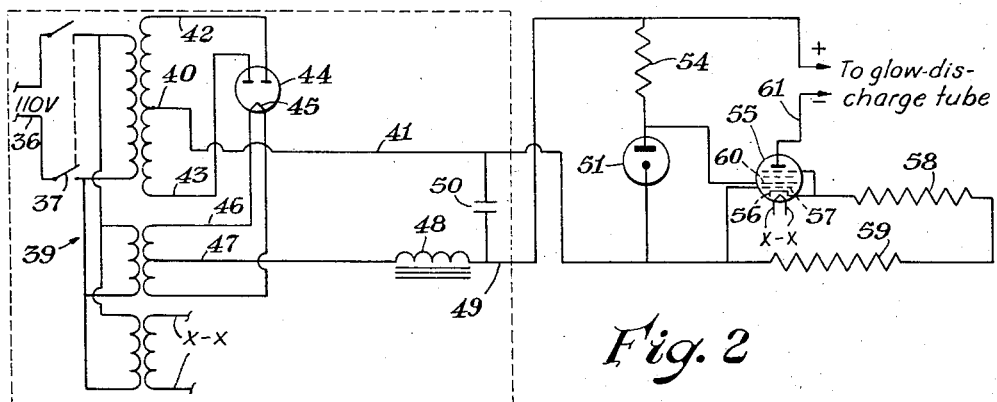
Fig. 2 is a diagram of the current regulated power supply shown in Fig. 1.

It will be appreciated that any of a variety of constant-current power supply systems 27 may be used to provide the operating potential for the glow discharge tube 11. One such system which effectively supplies constant direct current to the glow discharge tube 11 is shown diagrammatically in Fig. 2, and consists of a conventional full-wave power supply circuit (within the dotted lines) together with a constant current regulating circuit. As there illustrated, the full-wave power supply circuit receives power from a standard 110-volt alternating current line 36 which passes through a switch 37 to the primary of a step-up transformer 39. From the center tap 40 of the transformer secondary, negative or ground potential passes through a lead 41 directly to the constant-current regulating circuit. The end taps 42 and 43 of the transformer secondary, providing positive potential of about 1000 volts each, go to a full-wave rectifier tube 44, such as 5R4GY, the cathode 45 of which is heated by current derived from an additional secondary winding on the transformer 39. The rectified output, after passing through leads 46 and 47, goes through a choke coil 48 and from there through another lead 49 to the constant-current regulating circuit. Just prior to the latter, a filter condenser 50 is connected across the leads 41 and 49.

Interposed between the power supply circuit and the glow discharge tube is the constant-current regulating circuit. As shown, it includes a voltage regulating tube 51 connected across the output leads 41 and 49 (from the constant current power supply) through a current-limiting resistor 54. The current in the negative lead 41 flows through a current regulating pentode 55, e. g. a 6F6, which functions as a variable resistor. The resistance of the pentode 55 depends on the potential difference between the cathode 56 and the control grid 57 which are connected together through the resistors 58 and 59. The potential of the screen grid 60 for the pentode 55 is derived from the voltage regulating tube 51. The cathode 56 is heated by a third secondary winding on the transformer 39 by leads incompletely shown and marked X—X.

The operation of the current regulating pentode 55 is as follows: a change in potential between the output lead 61 from the pentode 55 and the positive lead 49 from the power supply causes the current passing through the pentode 55 to change. Any change in current through the pentode 55, however, alters the potential developed across the resistors 58 and 59. This changes the bias potential between the control grid 57 and the cathode 56, thereby altering the resistance of the pentode 55 and presenting a substantially constant total resistance across the power supply outlet.

Figure 3:
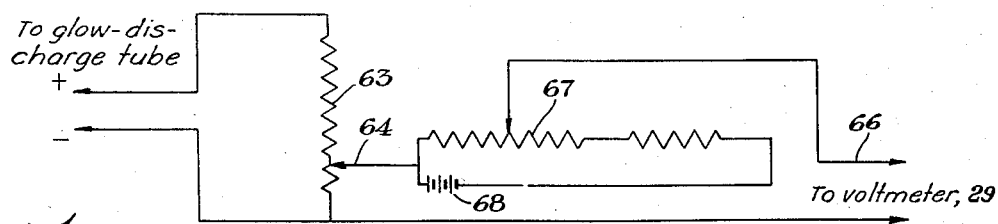
Fig. 3 is a diagram of the circuit leading to the voltmeter of Fig. 1.

The circuit involving the voltmeter 29 is shown in Fig. 3. For convenience, the voltmeter itself may have a maximum range of 20 millivolts, whereas the glow-discharge tube potential is of the order of 300 volts. Accordingly, the potential from the glow-discharge tube 11 is applied across a voltage-dividing resistance 63 with a side-lead 64 to the voltmeter 29 taken at a point such that voltmeter full scale potential is not exceeded. If desired, the lead 66 to the voltmeter may, as shown, be connected through an opposed bias potential supplied by a variable resistor 67 connected across a battery 68. Adjustment of the resistor 67 allows biasing of the zero position of the voltmeter 29 for added sensitivity so that the complete range of the instrument is adjusted to coincide with the expected range of voltage variation, e. g. from 235 to 305 volts.

In calibrating the glow discharge tube 11 to determine the concentration of argon admixed with hydrogen and nitrogen, a series of gas samples are employed each having a different but known argon content. Such a sample may be drawn through the glow discharge tube 11 by the vacuum pump 19 at a pressure, maintained constant by the pressure regulating valve 18, at a value less than 100 millimeters and preferably from 24 to 40 millimeters of mercury absolute. At a value within this lower range, pressure variations are less critical. At pressures below 2 millimeter of Hg absolute, however, the glow discharge is usually unstable and small changes in pressure have large effects on voltage.

A sufficiently large electrical potential is then applied to the electrodes 12 and 13 of the glow discharge tube 11 to establish a glow discharge across the gap therebetween. The resultant flow of current across the gap is adjusted to some predetermined value, e. g. between 8 and 15 milliamperes, and maintained constant at this value by action of a current regulated power supply 27. A glow discharge which envelopes the entire cathode 12 in an electric discharge is usually preferred. The difference in electrical potential, viz. voltage, across the electrodes 12 and 13 is a measure of the argon content, voltage being an inverse function of argon content at constant current.

The glow discharge apparatus so calibrated may be employed in a similar manner to analyze a gaseous mixture of unknown argon content for the percent concentration thereof in admixture with nitrogen and hydrogen. A glow discharge is established in the tube 11 and a stream of the gas to be analyzed is passed therethrough under conditions closely approximating those employed during calibration. For example, it is ordinarily desirable to maintain the gas pressure at a value within five percent of that at which the calibration was carried out. The current flow is also controlled, e. g. by the curent regulated power supply 27, generally within about 2 percent of the calibrated value. After the glow discharge has been initiated, a current of 10 milliamperes flowing across the electrodes 12 and 13 of the calibrated tube 11 will result in a potential difference of from approximately 305 volts with no argon present to about 235 volts with 20 percent argon present in the gas stream. If desired, the scale of the voltmeter 29 may be calibrated to read directly in percent argon.

There are many possible instruments which may be employed in conjunction with the voltage measuring device as shown to record as well as indicate the concentration of argon in admixture with nitrogen and hydrogen. Such instruments may be coupled to a conventional control system of a mechanical, electrical, pneumatic, or hydraulic type which can actuate valves or other control means in process vessels and lines to maintain the argon content of the gas stream at some chosen value.

Figure 4:
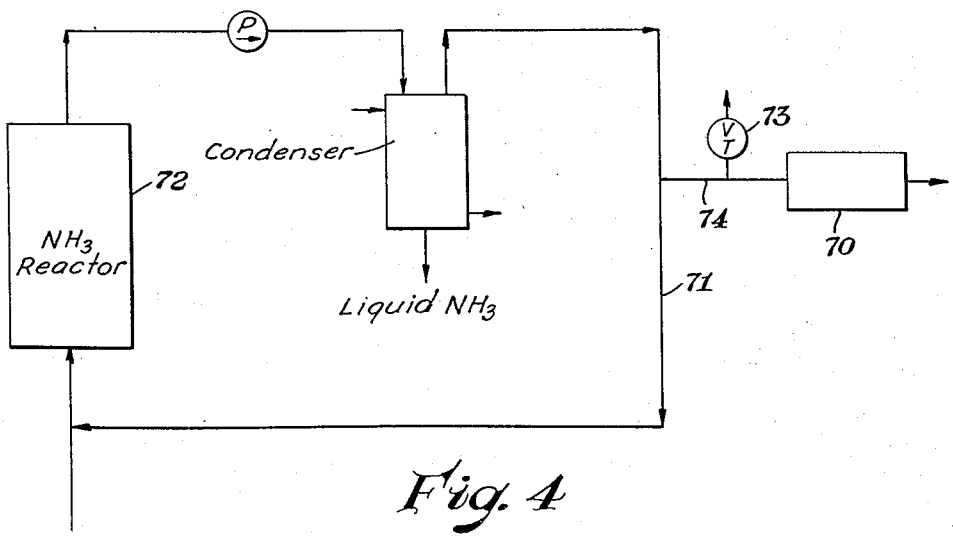
Fig. 4 is a diagrammatic view of an ammonia reactor together with a glow discharge analyzer-controller.

As shown in Figure 4, such a glow discharge analyzer-controller 70 is connected to a conduit 71 for recycling unconverted synthesis gas to the ammonia reactor 72. This combined analyzing and controlling instrument 70 continuously measures the argon content of the unconverted synthesis gas stream and regulates a throttle vent valve 73 which maintains said argon content below some predetermined maximum value e. g. 12 volume percent. More specifically, a small stream of unconverted synthesis gas is continuously passed between the electrodes of the glow discharge tube contained in the analyzer portion of the instrument. An electrical potential is applied across the electrodes of the glow discharge tube to maintain a continuous glow discharge therebetween and maintained at constant current by continuously regulating the applied potential. This resultant potential across the electrodes is then continuously measured as a function of the argon content of the stream of unconverted synthesis gas in the conduit 74. When the argon content of this gas stream approaches the aforesaid predetermined value, the analyzer portion of the instrument activates the controller portion thereof to open a throttle valve 73 and vent unconverted synthesis gas to the atmosphere.

Glow discharge tubes with many kinds of electrodes differing in size, shape, spacing, and materials of construction have been satisfactorily employed to measure argon in the presence of hydrogen and nitrogen as described above. These electrodes are operated at temperatures at which thermionic emission is negligible. Of the two electrodes, the cathode ordinarily deteriorates more rapidly than the anode. Since no cathode heating is required, the cathode life is not adversely affected by standby operation. Besides platinum and tungsten, some other materials from which suitable electrodes may be constructed are aluminum, copper, tantalum, magnesium, cadmium, iron, iron-nickel, iron-nickel-magnesium, and the like.

In determining the concentration of argon admixed with hydrogen and nitrogen, the ratio of the latter gases appears to have little if any effect on the accuracy of the determinations based on the calibrated values, particularly within the range of 2.5:1 to 3.5:1 hydrogen to nitrogen. Neither do the presence of trace amounts of noble gases other than argon interfere even when the argon content is approximately 20 volume percent and the normal atmospheric proportions of the other noble gases have increased correspondingly. However, the electrodes become contaminated when the gas mixture being analyzed contains appreciable proportions of such gases as water vapor, ammonia, oxygen, or any other oxidizing gas. It is therefore desirable to remove these substances from the gaseous mixture prior to its entry into the glow discharge tube. For example, in determining the concentration of argon in unconverted ammonia synthesis gas, it is desirable to pass such a gaseous mixture both through strong sulfuric acid to remove ammonia and through a drying agent, such as silica gel or magnesium perchlorate, to absorb moisture.

The concentration of argon in admixture with nitrogen and hydrogen may be determined in accord with the method of the invention either batchwise or continuously.

That which is claimed is:

1. A method for determining the argon content of a gaseous mixture of argon and at least one member of the group consisting of nitrogen and hydrogen which comprises passing a stream of such a gas at a constant pressure below 100 millimeters of mercury absolute through a glow discharge tube containing spaced electrodes therein, maintaining a continuous electric glow discharge of constant current between the electrodes of said tube, and measuring the potential across the electrodes during said discharge.

2. A method according to claim 1 wherein the gaseous mixture consists largely of hydrogen and nitrogen in a mole ratio of from about 2.5:1 to 3.5:1.

3. A method for determining the argon content of recycle ammonia synthesis gas which comprises passing a stream of the aforesaid gas at a constant reduced pressure of from 2 to 100 millimeters of mercury absolute through an enclosed zone and between spaced electrodes therein, maintaining a continuous electric glow discharge of constant direct current between the electrodes at a temperature at which thermionic emission is negligible, and measuring the electric potential across the electrodes.

References Cited in the file of this patent
UNITED STATES PATENTS

| | | |
|---|---|---|
| 1,421,720 | Roberts | July 4, 1922 |
| 1,697,339 | Baker | Jan. 1, 1929 |
| 2,370,475 | Lemmers | Feb. 27, 1945 |
| 2,504,772 | White | Apr. 18, 1950 |
| 2,640,870 | Seitz | June 2, 1953 |